United States Patent
Tao et al.

(10) Patent No.: US 9,424,454 B2
(45) Date of Patent: Aug. 23, 2016

(54) CHIP ON BOARD BASED HIGHLY INTEGRATED IMAGER

(71) Applicant: Honeywell International Inc., Fort Mill, SC (US)

(72) Inventors: Xi Tao, Suzhou (CN); Yong Liu, Suzhou (CN); Taylor Smith, Charlotte, NC (US); Ynjiun Paul Wang, Cupertino, CA (US)

(73) Assignee: Honeywell International, Inc., Fort Mill, SC (US)

( * ) Notice: Subject to any disclaimer, the term of this patent is extended or adjusted under 35 U.S.C. 154(b) by 182 days.

(21) Appl. No.: 14/062,239

(22) Filed: Oct. 24, 2013

(65) Prior Publication Data
US 2014/0110485 A1    Apr. 24, 2014

(30) Foreign Application Priority Data
Oct. 24, 2012  (CN) .......................... 2012 1 0411590

(51) Int. Cl.
*G06K 7/10* (2006.01)
*G06K 7/015* (2006.01)
*H04N 5/225* (2006.01)

(52) U.S. Cl.
CPC ............ *G06K 7/10851* (2013.01); *G06K 7/015* (2013.01); *G06K 7/10821* (2013.01); *H04N 5/2251* (2013.01); *H04N 5/2253* (2013.01); *H04N 5/2257* (2013.01)

(58) Field of Classification Search
None
See application file for complete search history.

(56) References Cited

U.S. PATENT DOCUMENTS

| 5,363,202 A | 11/1994 | Udagawa et al. |
| 6,381,030 B1 | 4/2002 | Udagawa et al. |
| 6,388,767 B1 | 5/2002 | Udagawa et al. |

(Continued)

FOREIGN PATENT DOCUMENTS

| CN | 103780847 A | 5/2014 |
| WO | 2013163789 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Michael G Lee
*Assistant Examiner* — Tabitha Chedekel
(74) *Attorney, Agent, or Firm* — Additon, Higgins & Pendleton, P.A.

(57) ABSTRACT

An apparatus for use in decoding a bar code symbol may include an image sensor integrated circuit having a plurality of pixels, timing and control circuitry for controlling an image sensor, gain circuitry for controlling gain, and analog to digital conversion circuitry for conversion of an analog signal to a digital signal. The apparatus may also include a PCB for mounting the image sensor integrated circuit and light source bank. The connection between the image sensor integrated circuit and/or light source bank and the PCB characterized by a plurality of wires connecting a plurality of bond pads and a plurality of contact pads, where the wires, bond pads, and contact pads provide electrical input/output and mechanical connections between the image sensor integrated circuit and the PCB. The apparatus may be operative for processing image signals generated by the image sensor integrated circuit for attempting to decode the bar code symbol.

13 Claims, 4 Drawing Sheets

(56) References Cited

U.S. PATENT DOCUMENTS

| | | |
|---|---|---|
| 6,832,725 B2 | 12/2004 | Gardiner et al. |
| 7,097,101 B2 | 8/2006 | Kogan et al. |
| 7,128,266 B2 | 10/2006 | Zhu et al. |
| 7,159,783 B2 | 1/2007 | Walczyk et al. |
| 7,270,274 B2 | 9/2007 | Hennick et al. |
| 7,279,782 B2 | 10/2007 | Yang et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 2001/0038547 A1 | 11/2001 | Jigour et al. |
| 2004/0159703 A1 | 8/2004 | Kogan et al. |
| 2007/0040034 A1* | 2/2007 | Hennick ............ G06K 7/10732 235/462.41 |
| 2007/0063048 A1 | 3/2007 | Havens et al. |
| 2008/0135728 A1 | 6/2008 | Yang et al. |
| 2008/0185432 A1 | 8/2008 | Caballero et al. |
| 2009/0134221 A1 | 5/2009 | Zhu et al. |
| 2009/0242641 A1 | 10/2009 | Blasczak |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0256418 A1 | 10/2013 | Havens et al. |

(56) References Cited

U.S. PATENT DOCUMENTS

| | | |
|---|---|---|
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0025584 A1 | 1/2014 | Liu et al. |
| 2014/0027518 A1 | 1/2014 | Edmonds et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/376,472, for an Encoded Information Reading Terminal Including HTTP Server filed Aug. 4, 2014, (Lu); 30 pages.

U.S. Appl. No. 13/771,508 for an Optical Redirection Adapter, filed Feb. 20, 2013 (Anderson); 26 pages.

U.S. Appl. No. 14/340,716 for an Optical Imager and Method for Correlating a Medication Package With a Patient, filed Jul. 25, 2014 (Ellis); 26 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

(56) References Cited

OTHER PUBLICATIONS

U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al.); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively to Trigger signal activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
U.S. Appl. No. 14/200,405 for Indicia Reader for Size-Limited Applications , not yet published, Feng et al. filed Mar. 7, 2014, 42 pages.
U.S. Appl. No. 14/274,858 for Mobile Printer With Optional Battery Accessory, filed May 12, 2014, (Marty et al.); 26 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.
U.S. Appl. No. 14/379,057 for Method of Using Camera Sensor Interface to Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.

* cited by examiner

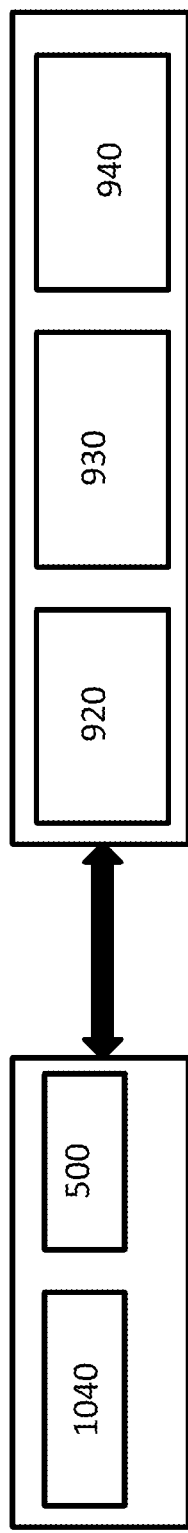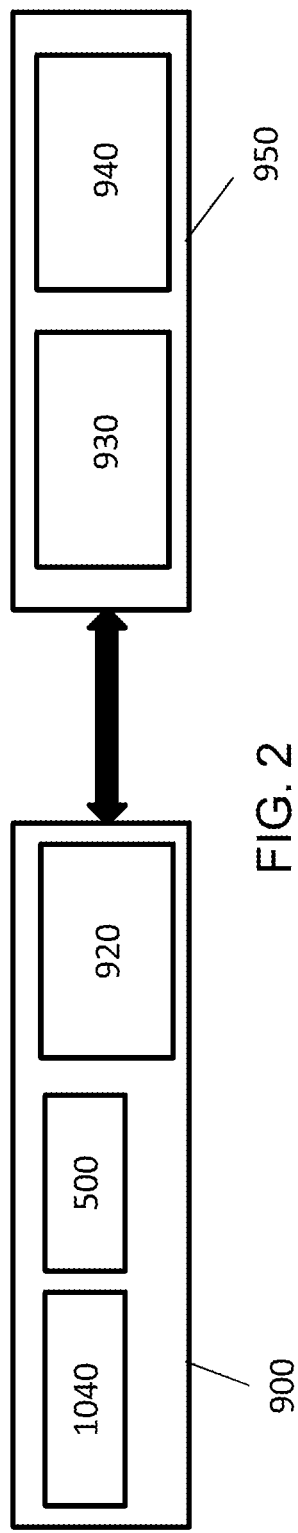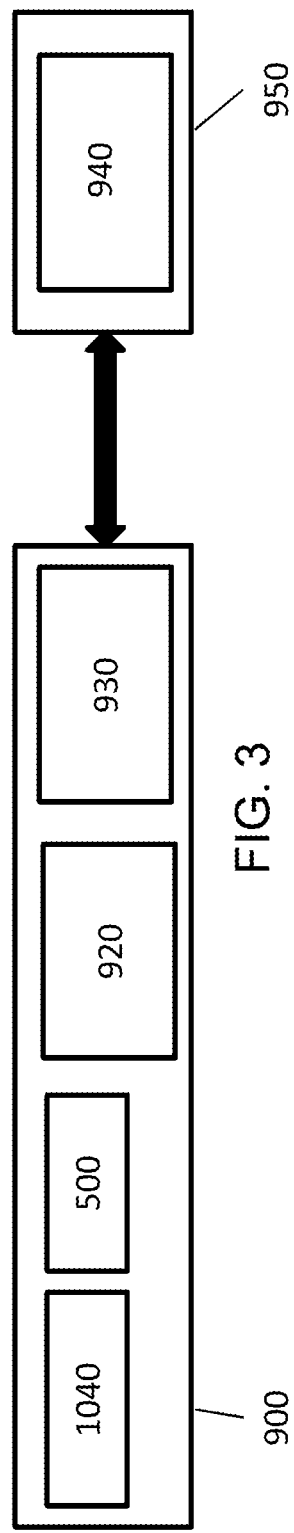

CHIP ON BOARD BASED HIGHLY INTEGRATED IMAGER

FIELD OF THE INVENTION

The present invention relates, in general, to decoding of bar code symbols, and is particularly related to an apparatus for use in decoding a bar code symbol with multiple elements mounted directly onto a printed circuit board.

BACKGROUND OF THE INVENTION

Indicia reading terminals fir reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button (trigger) that can be actuated by an index finger. Indicia reading terminals having, keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to enable actuation by a thumb of an operator. Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality. Some indicia reading terminals are adapted to read bar code symbols including one or more of one dimensional (1D) bar codes, stacked 1D bar codes, and two dimensional (2D) bar codes. Other indicia reading terminals are adapted to read OCR characters while still other indicia reading terminals are equipped to read both bar code symbols and OCR characters.

BRIEF DESCRIPTION OF THE DRAWINGS

The features described herein can be better understood pith reference to the drawings described below. The drawings are not necessarily to scale, emphasis instead generally being placed upon illustrating the principles of the invention. In the drawings, like numerals are used to indicate like parts throughout the various views.

FIG. 1 is a block diagram of an apparatus for use in decoding a bar code symbol, the apparatus having an image sensor and LED dies mounted directly on a single printed circuit board, in accordance with an aspect of the invention;

FIG. 2 is a block diagram of an apparatus for use in decoding a bar code symbol, the apparatus having an image sensor, LED dies, and LED drive circuitry mounted directly on a single printed circuit board, in accordance with an aspect of the invention;

FIG. 3 is a block diagram of an apparatus for use in decoding a bar code symbol, the apparatus having an image sensor, LED dies, LED drive circuitry, and processor circuitry mounted directly on a single printed circuit board, in accordance with an aspect of the invention;

SUMMARY OF THE INVENTION

Figure 4:
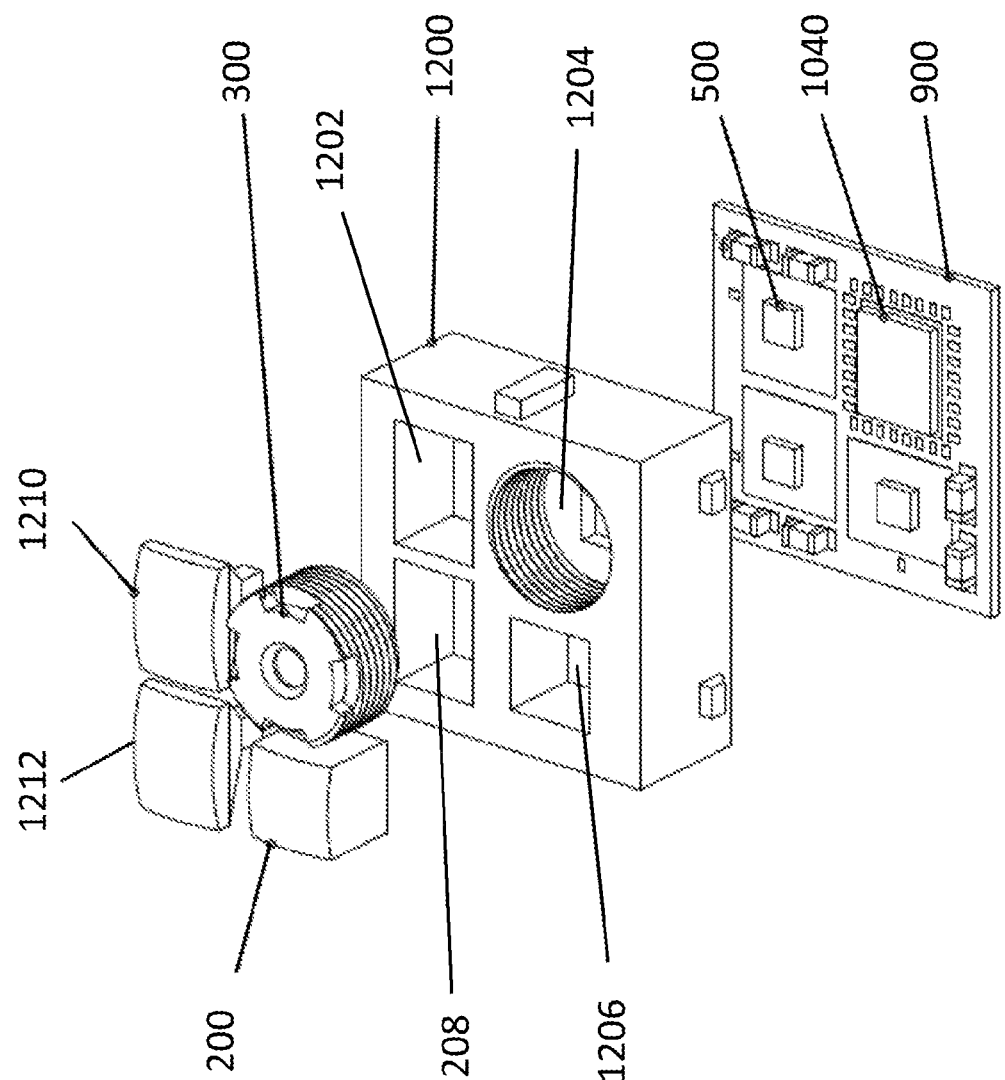
FIG. 4 is an exploded perspective view of an apparatus for use in decoding a bar code symbol, in accordance with an aspect of the invention.

According to one aspect an invention for use in decoding a bar code symbol is provided. The apparatus may include an image sensor integrated circuit having a plurality of pixels arranged in a plurality of rows and columns of pixels, timing and control circuitry for controlling an image sensor, gain circuitry for controlling the gain of one or more signals, analog to digital conversion circuitry for conversion of an analog signal to a digital signal, and a plurality of electrode pads on a surface of the image sensor integrated circuit. The apparatus may also include a light source bank. Further, the apparatus may include a single printed circuit board for receiving the image sensor integrated circuit and the light source bank and including a plurality of contact pads disposed on a surface of the printed circuit board. The image sensor integrated circuit may be mounted directly on the single printed circuit board and then wire bonded directly to the printed circuit board to provide electrical input/output and mechanical connections between the image sensor integrated circuit and the printed circuit board. The light source bank may be mounted directly on the single printed circuit board and then wire bonded directly to the printed circuit board to provide electrical input/output and mechanical connections between the light source bank and the printed circuit board. The apparatus may be operative for processing image signals generated by the image sensor integrated circuit for attempting to decode the bar code symbol.

According to alternative aspects, the apparatus may further comprise a hand held housing encapsulating the image sensor integrated circuit and the light source hank. In one aspect, the light source bank may be an LED die. In a further aspect, light source bank circuitry may be mounted directly to the single printed circuit board and wire bonded directly to the printed circuit board. In another aspect, a processor circuitry may be mounted directly to the single printed circuit board and wire bonded directly to the printed circuit board. In another aspect, the apparatus may include an aimer light source bank positioned on the printed circuit board. The aimer light source bank may be an LED die. The apparatus may include an aimer subsystem electrically connected to the printed circuit board. In another aspect, the processing of image signals generated by the image sensor integrated circuit for attempting to decode the bar code symbol may be performed within the housing. In another aspect, the processing of the image signal generated by the image sensor integrated circuit for attempting to decode the bar code symbol is performed by circuitry external to the housing. In another aspect, the processing of image signals generated by the image sensor integrated circuit for attempting to decode the bar code symbol may be performed by a circuit disposed on the primed circuit board. In an alternative aspect, the processing of image signals generated by the image sensor integrated circuit for attempting to decode the bar code symbol may be performed by a computer external to the housing.

DETAILED DESCRIPTION OF THE INVENTION

In traditional applications, barcode engines and other scanning devices have typically been disposed on multiple Printed Circuit Boards (PCBs). Multiple PCBs have been required because image based barcode scanners required a large number of component parts, including, but not limited to, an image sensor, a lens assembly, an illumination light source, an aimer light source a microcontroller, processor, RAM, and/or flash memory some of which were large and/or bulky. Where additional PCBs are used, the costs and the risk of product failure due to potential connection problems between PCBs increase. In addition, traditional applications have constraints or limitations on the size of the PCBs.

According to the present invention, more than one of the components for an imaging based barcode scanner engine may be mounted directly on a common PCB. The placement of component parts on a common PCB reduces the overall cost and risk of failure of the imaging based barcode scanner engine. In various embodiments, an image sensor integrated circuit including, for example, a camera module, an illumination light source, and/or an aimer light source may all be mounted on a single PCB with a light source bank. If desired, additional elements may be mounted directly on the common PCB.

Referring now to FIG. 1, an apparatus 1000 for use in decoding a bar code symbol is shown and described. The apparatus 1000 including an image sensor 1040 and a light source bank 500 mounted directly on a common printed circuit board 910. The image sensor 1040 and light source bank 500 are described in greater detail below. Other packaged components, such as a light source bank driver circuitry 920, processor circuitry 930, and additional circuitry 940 may be disposed on a second circuit board 950 that is connected to the common printed circuit board 910. As illustrated in FIG. 2, the light source bank driver circuitry 920 may also be mounted directly on the common printed circuit board 910 with the image sensor 1040 and the light source bank 500. In this embodiment the processor circuitry 930 and additional circuitry 940 may be disposed on a second circuit board 950 that is connected to the common printed circuit board 910. FIG. 3 depicts a further embodiment, wherein the processor circuitry 930 is also mounted directly on the common printed circuit board 910 with the image sensor 1040, the light source bank 500, and the light source bank driver circuitry 920. The additional circuitry 940 may be disposed on a second circuit board 950 that is connected to the common printed circuit board 910 in the present embodiment.

The printed circuit board 910 including the image sensor 1040 and the light source bank 500 mounted directly to the printed circuit board 910 is depicted in FIG. 4. As illustrated the image sensor 1040 and the light source bank 500 are mounted directly onto the printed circuit board 910 along with additional components. A housing 1200 that may be secured over the printed circuit board 910 and the housing including a first opening 1202, a second opening 1204, a third opening 1206, and a fourth opening 1208. When the housing 1200 is mounted onto the printed circuit board 910 the first opening 1202 aligns with the light source hank 500 and the second opening 1204 aligns with the image sensor 1040. Further, the third and fourth openings 1206 and. 1208 align with the components directly under the openings 1206 and 1208. A light pipe 1210 may be secured within the opening 1202 enabling light to pass into and out of the housing 1200 from the light source bank 500 as needed by the apparatus 1000. An illumination lens assembly 300 may be secured within the opening 12.04 enabling the lens assembly 300 to transfer data between a target and the image sensor 1040. A lens assembly 200 may be secured within the opening 1206 to interact with the image sensor 1040 and providing the image sensor 1040 the ability to focus an image. A second light pipe 1212 may be secured in opening 1208 enabling light to pass into and out of the housing 1200 as needed by components mounted directly onto the printed circuit board 910 of the apparatus 1000.

An exemplary hardware platform for support of operations described herein with reference to apparatus 1000 for use in decoding a bar code symbol is shown and described with reference to FIG. 5.

Bar code decoding apparatus 1000 may include a housing 1014. Apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier or gain circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively. CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. An imaging subsystem of apparatus 1000 can include image sensor 1032 and a lens assembly 200 for focusing an image onto image sensor array 1033 of image sensor 1032, In the course of operation of apparatus 1000, image signals can be read out of image sensor 1032., converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, imaging lens assembly 200 can be adapted for focusing an image of a decodable indicia 15 located within a field of view 1240 on a substrate, onto image sensor array 1033. A size in target space of a field of view 1240 of apparatus 1000 can be varied in a number of alternative ways. A size in target space of a field of view 1240 can be varied e.g., by changing a terminal to target distance, changing an imaging lens assembly setting, changing a number of pixels of image sensor array 1033 that are subject to read out. Imaging fight rays can he transmitted about imaging axis 25. Lens assembly 200 can be adapted to be capable of multiple focal lengths and multiple planes of optimum focus (best focus distances).

Apparatus 1000 can include an illumination subsystem 600 for illumination of target, T, and projection of an illumination pattern 12.60. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. The apparatus 100 may be configured so that the light from light source bank 500 is directed toward a field of view 1240. Thus in various embodiments, light source bank 500 may be configured such that is affixed to the apparatus 1000, while in other embodiments light source bank 500 may be remote and direct light toward apparatus 1000 or field of view 1240

An imaging module 900 can be provided having a circuit board carrying image sensor 1032, and lens assembly 200 disposed in a support on a circuit board. The illumination subsystem 800 may have a light source bank 500 provided by single light source. The single light source may be, for example purposes, an LED die. In another embodiment, light source bank 500 can be provided by more than one light source for example, more than one LED die. Apparatus 1000 can be adapted so that light from each of a one or more light source of light source bank 500 is directed toward field of view 1240 and utilized for projection of illumination pattern 1240. Referring again to FIG. 5, apparatus 1000 can also include an aiming subsystem 600 for projecting an aiming pattern 1242. Aiming subsystem 600 which can comprise a light source bank can be coupled to aiming light source bank power input unit 1208 for providing electrical power to a light source bank of aiming subsystem 600. The aiming light source bank may be, for example, one or more light source. Apparatus 1000 can be adapted so that light from one or more light source of aiming light source 600 is directed toward field of view 1240 and is utilized for projection of aiming pattern 1242. Power input unit 1208 can be coupled to system bus 1500 via interface 1108 for communication with CPU 1060.

Figure 5:
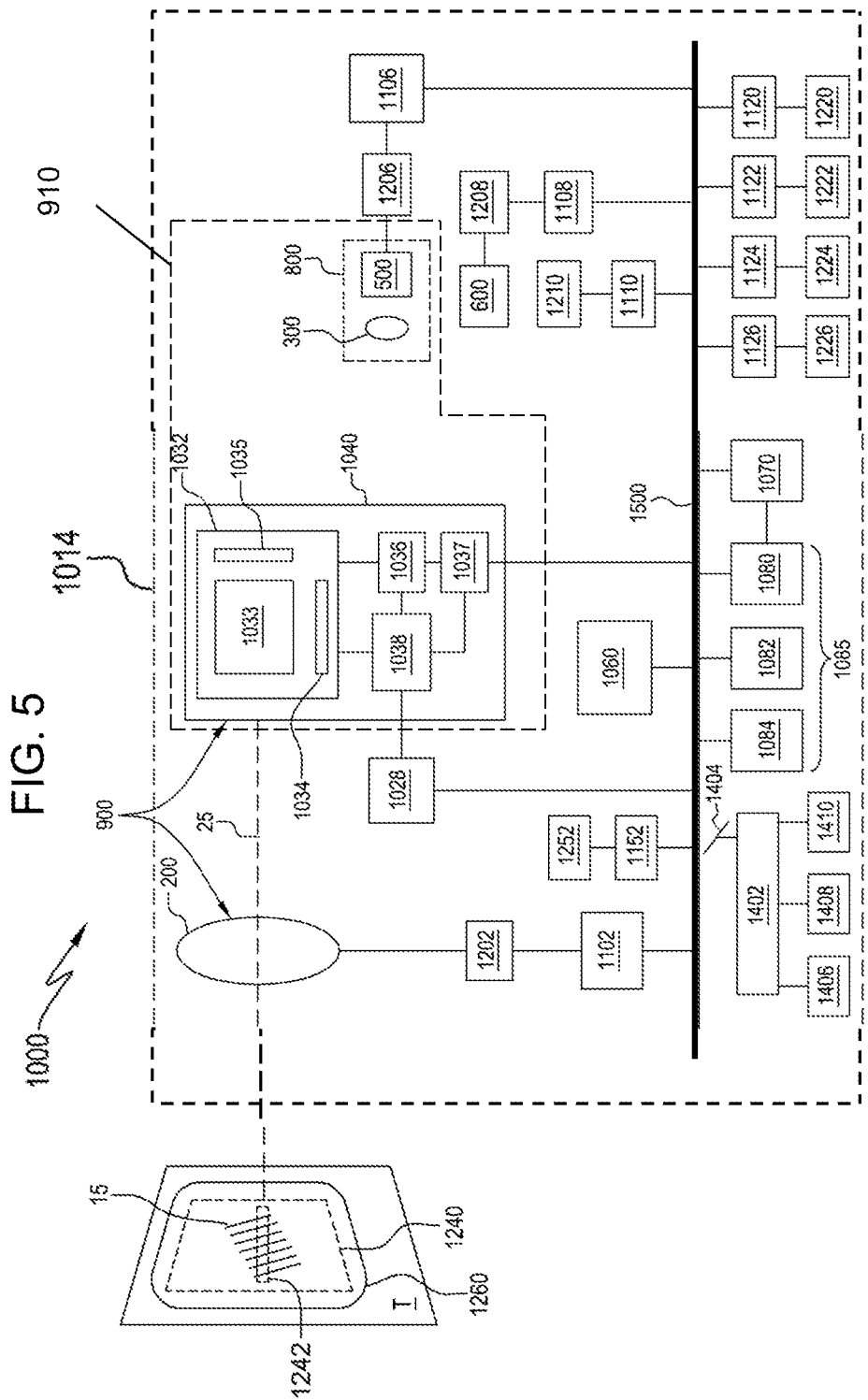
FIG. 5 is a block diagram of an apparatus for use in decoding a bar code symbol, the apparatus having multiple elements mounted directly on a single printed circuit board in accordance with an aspect of the invention.

In one embodiment, illumination subsystem 800 can include, in addition to light source bank 500, an illumination lens assembly 300, as is shown in the embodiment of FIG. 5. In addition to or in place of illumination lens assembly 300 illumination subsystem 800 can include alternative light shaping optics, e.g. one or more diffusers, mirrors and prisms. In use, apparatus 1000 can be oriented by an operator with respect to target, T, (e.g., a piece of paper, a package, another type of substrate) bearing decodable indicia 15 in such manner that illumination pattern 1260 is projected on a decodable indicia 15. In the example of FIG. 5, decodable indicia 15 is provided by a 1D bar code symbol. Decodable indicia 15 could also be provided by a 2D bar code symbol or optical character recognition (OCR) characters. Referring to further aspects of apparatus 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, serial interface 1408 (e.g., USB, RS232), and/or AC/DC transformer 410).

Further regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol. CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated in an integrated circuit disposed on circuit board.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Apparatus 1000 can also include a keyboard 1226 coupled to system bus 1500 via interface 1126. Various interface circuits of apparatus 1000 can share circuit components. For example, a common microcontroller can be established fir providing control inputs to both image sensor timing and control circuit 1038 and to power input unit 12.06. A common microcontroller providing control inputs to circuit 1038 and to power input unit 1206 can be provided to coordinate timing between image sensor array controls and illumination subsystem controls. Apparatus 1000 may include a network communication interface 1252 coupled to system bus 1500 and in communication with CPU 1060, via interface 1152. Network communication interface 1252 may be configured to communicate with an external computer through a network.

A succession of frames of image data that can be captured and subject to the described processing can be full frames (including pixel values corresponding to each pixel of image sensor array 1033 or a maximum number of pixels read out from image sensor array 1033 during operation of apparatus 1000). A succession of frames of image data that can be captured and subject to the described processing can also be "windowed frames" comprising pixel values corresponding to less than a full frame of pixels of image sensor array 1033. A succession of frames of image data that can be captured and subject to the described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 1000 can be increased (and frame time decreased) by decreasing of a frame picture size.

Figure 6:
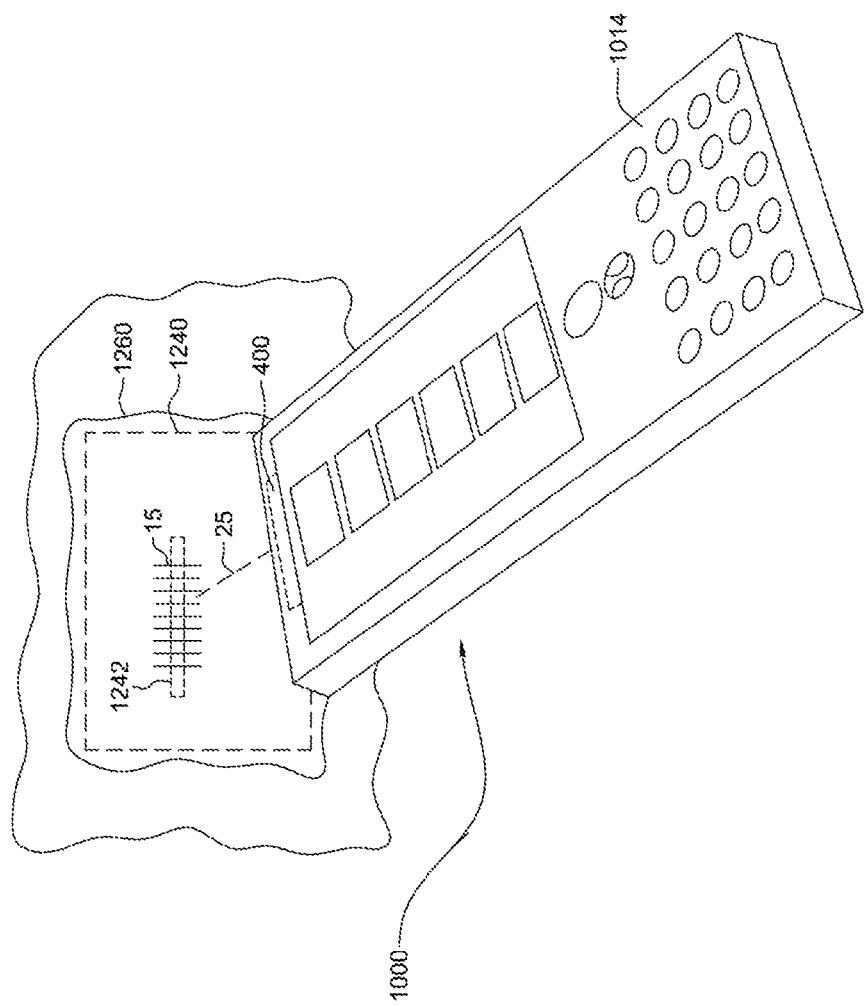
FIG. 6 is a perspective view of an apparatus for use in decoding a bar code symbol, in accordance with an aspect of the invention.

Referring now to FIG. 6, an example apparatus 1000 is shown. Specifically, apparatus 1000 may have a housing 1014, which as shown in FIG. 6, may be a hand held housing. Housing 1014 is configured to encapsulate image sensor integrated circuit 1040 (shown in FIG. 4). A microprocessor integrated circuit having a CPU for attempting to decode decodable indicia can be disposed on circuit board. Such microprocessor integrated circuit may be disposed externally to the circuit board, for example, on a circuit board external to circuit board within housing 1014. In another embodiment, apparatus 1000 may include CPU 1060, memory 1085, and network communication interface 1252 comprising a first computer housed within housing 1014 (shown in FIG. 5), and a second computer 6000 external to housing 1014, having a CPU 6010, memory 6020, and a network communication interface 6030. Image data can he transmitted to the second computer 6000 for processing by the CPU 6010 for attempting to decode decodable indicia.

A small sample of systems, methods, and apparatus that are described herein is as follows:

A1. An apparatus for use in decoding a bar code symbol, the apparatus comprising:
 an image sensor integrated circuit, the image sensor integrated circuit having a plurality of pixels arranged in a plurality of rows and columns of pixels, timing and control circuitry for controlling an image sensor, gain circuitry for controlling the gain of one or more signals, analog to digital conversion circuitry for conversion of an analog signal to a digital signal, and a plurality of electrode pads on a surface of the image sensor integrated circuit;
 a light source bank;
 a single printed circuit board receiving the image sensor integrated circuit and the light source bank, the printed circuit board having a plurality of contact pads disposed on a surface of the printed circuit board;
 wherein a connection between said image sensor integrated circuit and said printed circuit board is characterized by a plurality of wires connecting a plurality of bond pads on the image sensor to the plurality of contact pads on the printed circuit board, the wires, bond pads, and contact pads providing electrical input/output and mechanical connections between said image sensor integrated circuit and said printed circuit board; and
 wherein a connection between said light source bank and said printed circuit board is characterized by a plurality of wires connecting a plurality of bond pads on the light source bank to a plurality of bond pads on the printed circuit board, the wires and bond pads providing electrical input/output and mechanical connections between said light source bank and said printed circuit board.

A2. The apparatus of A1, wherein the apparatus is operative for processing of image signals generated by the image sensor integrated circuit for attempting to decode the bar code symbol.

A3. The apparatus of A1, further comprising:
 a hand held housing encapsulating the image sensor integrated circuit and the light source bank.

A4. The apparatus of A3 wherein the processing of image signals generated by the image sensor integrated circuit for attempting to decode the bar code symbol is performed within the housing.

A5. The apparatus of A3, wherein the processing of image signals generated by the image sensor integrated circuit for attempting to decode the bar code symbol is performed by circuitry external to the housing.

A6. The apparatus of A1, wherein the processing of image signals generated by the image sensor integrated circuit for attempting to decode the bar code symbol is performed by a circuit disposed on said printed circuit board.

A7. The apparatus of A1, wherein the processing of image signals generated by the image sensor integrated circuit for attempting to decode the bar code symbol is performed by a computer external to the housing.

A8. The apparatus of A1 wherein the light source bank is an LED die.

A9. The apparatus of A1, further comprising:
a light source bank circuitry for controlling the operation of the light source bank, the light source bank electrically connected to the light source bank circuitry; and
wherein a connection between the light source bank driver circuitry and said primed circuit board is characterized by a plurality of wires connecting a plurality of bond pads on the light source bank driver circuitry to the plurality of contact pads on the printed circuit board, the wires, bond pads, and contact pads providing electrical input/output and mechanical connections between said image sensor integrated circuit and said printed circuit board.

A10. The apparatus of A9, further comprising:
a processor circuitry; and
wherein a connection between the processor circuitry and said primed circuit board is characterized by a plurality of wires connecting a plurality of bond pads on the processor circuitry to the plurality of contact pads on the printed circuit board, the wires, bond pads, and contact pads providing electrical input/output and mechanical connections between said images sensor integrated circuit and said printed circuit board.

A11. The apparatus of A1, further comprising:
an aimer light source bank positioned on said printed circuit board.

A12. The apparatus of A11, wherein the aimer source bank is an LED die.

A13. The apparatus of A1, further comprising:
an aimer subsystem and an aimer light circuitry for controlling the operation of an aimer light bank, the aimer light bank electrically connected to the aimer light circuitry, and the aimer light circuitry electrically connected to said printed circuit board.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. An apparatus for use in decoding a bar code symbol, the apparatus comprising:
an image sensor integrated circuit, the image sensor integrated circuit having a plurality of pixels arranged in a plurality of rows and columns of pixels, timing and control circuitry for controlling an image sensor, gain circuitry for controlling the gain of one or more signals, analog to digital conversion circuitry for conversion of an analog signal to a digital signal, and a plurality of electrode pads on a surface of the image sensor integrated circuit;
a light source bank;
a single printed circuit board with the image sensor integrated circuit and the light source bank mounted directly thereon, the printed circuit board having a plurality of contact pads disposed on a surface of the printed circuit board;
wherein a connection between said image sensor integrated circuit and said printed circuit board is characterized by a plurality of wires connecting a plurality of bond pads on the image sensor to the plurality of contact pads on the printed circuit board, the wires, bond pads, and contact pads providing electrical input/output and mechanical connections between said image sensor integrated circuit and said printed circuit board; and wherein a connection between said light source bank and said printed circuit board is characterized by a plurality of wires connecting a plurality of bond pads on the light source bank to a plurality of bond pads on the printed circuit board, the wires and bond pads providing electrical input/ output and mechanical connections between said light source bank and said printed circuit board.

2. The apparatus of claim 1, wherein the apparatus is operative for processing of image signals generated by the image sensor integrated circuit for attempting to decode the bar code symbol.

3. The apparatus of claim 1, further comprising:
a hand held housing encapsulating the image sensor integrated circuit and the light source bank.

4. The apparatus of claim 3, wherein the processing of image signals generated by the image sensor integrated circuit for attempting to decode the bar code symbol is performed within the housing.

5. The apparatus of claim 3, wherein the processing of image signals generated by the image sensor integrated circuit for attempting to decode the bar code symbol is performed by circuitry external to the housing.

6. The apparatus of claim 1, wherein the processing of image signals generated by the image sensor integrated circuit for attempting to decode the bar code symbol is performed by a circuit disposed on said printed circuit board.

7. The apparatus of claim 1, wherein the processing of image signals generated by the image sensor integrated circuit for attempting to decode the bar code symbol is performed by a computer external to the housing.

8. The apparatus of claim 1 wherein the light source bank is an LED die.

9. The apparatus of claim 1, further comprising:
a light source bank circuitry for controlling the operation of the light source bank, the light source bank electrically connected to the light source bank circuitry; and
wherein a connection between the light source bank driver circuitry and said printed circuit board is characterized by a plurality of wires connecting a plurality of bond pads on the light source bank driver circuitry to the plurality of contact pads on the printed circuit board, the wires, bond pads, and contact pads providing electrical input/output and mechanical connections between said image sensor integrated circuit and said printed circuit board.

10. The apparatus of claim 9, further comprising:
a processor circuitry; and
wherein a connection between the processor circuitry and said printed circuit board is characterized by a plurality of wires connecting a plurality of bond pads on the processor circuitry to the plurality of contact pads on the printed circuit board, the wires, bond pads, and contact pads providing electrical input/output and mechanical connections between said images sensor integrated circuit and said printed circuit board.

11. The apparatus of claim 1, further comprising:
an aimer light source bank positioned on said printed circuit board.

12. The apparatus of claim 11, wherein the aimer source bank is an LED die.

13. The apparatus of claim 1, further comprising:
an aimer subsystem and an aimer light circuitry for controlling the operation of an aimer light bank, the aimer light bank electrically connected to the aimer light circuitry, and the aimer light circuitry electrically connected to said printed circuit board.

* * * * *